Patented May 3, 1938

2,115,896

UNITED STATES PATENT OFFICE 2,115,896

RUBBER SUBSTITUTES

Peter J. Wiezevich, now by judicial change of name Peter J. Gaylor, Elizabeth, N. J., assignor to Standard Oil Development Company, a corporation of Delaware No Drawing. Application December 30, 1933, Serial No. 704,791

9 Claims. (Cl. 260—2)

This invention relates to the preparation of rubber substitutes and more particularly to an improved method of plasticizing resinous polymers and similar compounds.

Products formed by polymerizing compounds such as vinyl chloride, vinyl acetate, chlorprene, and the like, as well as cellulose esters and other compounds such ethyl- or benzyl cellulose and cellulose trilaurate, are usually hard and brittle or horny and tough and for many purposes require the incorporation of a plasticizing or softening agent in order to ameliorate these properties.

The present invention comprises essentially the precipitation of polymerized vinyl compounds which are essentially linear in structure out of solution in the presence of a suitable plasticizing agent which must, in general, be a rather high molecular weight, high boiling liquid boiling above 200° C., or semi-solid compounds. Suitable plasticizers for this purpose are aryl esters such as tricresyl phosphate (B. P. 410° C.), alkyl esters as for example dibutyl phthalate (B. P. 343° C.), alkylated naphthalenes, high boiling mineral oils, glyceride oils, hydrocarbon residua, asphalt, voltolized mineral oils, cresol-, phenol-, or naphthol- carbonates, rubber, resins and waxes, chlorinated aromatic hydrocarbons, thickened glycerides, or polymerized olefins and diolefines such as the plastic product obtained by polymerizing isobutylene at low temperature with boron fluoride, or the residues obtained from the distillation of oxidized oils or waxes. Ordinarily, the amount of plasticizer should be 0.1–20% based on the weight of the vinyl polymer, although higher amounts may also be used to advantage.

In carrying out the invention, a vinyl compound is polymerized and the polymerized product dissolved in the plasticizer or solvent containing a certain proportion of the plasticizer are co-precipitated out of the solution by adding a suitable non-solvent, or else an already polymerized vinyl compound is dissolved in the plasticizer and then precipitated out by the addition of a non-solvent. The plasticizer may be completely or only partially soluble in the polymer.

In preparing the polymers, any of the vinyl compounds which form high molecular weight polymers can be used, for example: vinyl chloride, bromide or other halide may be used, or vinyl acetate or chloro-acetate, vinyl propyl ether or other esters, ethers, and similar compounds. Generally, the vinyl halides polymerize readily on standing and are accelerated by sunlight or ultraviolet light while the acetates require a slight amount of heating, generally in presence of accelerators such as benzoyl peroxide and the like. Chloro-2-butadiene 1, 3 may also be used, as well as resinous cellulose derivatives referred to above. Several compounds may be polymerized conjointly, such as vinyl chloride and vinyl acetate. Catalysts may be used to hasten the polymerization, as for example, substances such as organic peroxides, acid anhydrides, percarbonates, metal oxides and salts. If the vinyl compounds are polymerized by themselves, i. e. without the use of a solvent, the reaction may become violent; the course of the reaction may be controlled evenly by use of a solvent. It is desired to obtain the resin in highly polymerized, hard, brittle form, first, before applying a plasticizer, although this is not absolutely essential. The solvent together with any unpolymerized vinyl compound may be evaporated off from the resin or the resin may be precipitated out of solution by the addition of a suitable material such as alcohol, mineral oil, etc.

The solvent to be used either during the course of polymerization or for dissolving an already polymerized vinyl compound may be any of the well known solvents for this type of product, i. e., benzol, chlorobenzol, acetone, ether, chloroform, methyl ethyl ketone, dibutyl phthalate, propyl adipate, diacetin, diphenyl oxide, nitrobenzene, benzaldehyde, etc.

In carrying out the invention a solution of polymerized vinyl compound and a plasticizer dissolved in a suitable solvent is first prepared by one of the methods above described. If desired, other compounding agents or fillers may be added such as carbon black, zinc oxide, rosin, camphor, barytes and other inorganic water-insoluble salts, lithopone, pigments, dyes, oxidation inhibitors, sulfur, asphaltenes, etc. As oxidation inhibitors the following may be used: alpha-naphthol, sulfur, thionaphthols and other sulfur compounds, condensed aromatics, hydroquinone and acetyl amino phenol. Polymerization inhibitors such as sulfur, trinitrobenzene, di-o-tolyl guanidine, hexaphenyl ethane, and thiodiphenylamine, may also be incorporated. In order to effect a coprecipitation of the polymerized vinyl compound together with a certain amount of the plasticizer, a suitable non-solvent or precipitating agent is added such as mineral lubricating oils, naphtha, Varsol, chlorinated diphenyl, alcohols, glycerides, ethyl oleate, ethyl abietate, butyl cellosolve, propylene glycol, etc. After the precipitation the liquid is separated from the plastic precipitated mass by draining, decantation or any other convenient method, with or without subsequent washing with a suitable volatile liquid such as naphtha or the like.

By carrying out the invention in the process described, a rubber substitute is obtained which is plastic, tough, and possibly also elastic, depending upon the type of polymerization used. The exact mechanism of the operation of the invention is not well understood but it is believed that when the polymerized vinyl compound or other resinous polymer is precipitated out of solution it carries with it a certain amount of the plasticizer either due to a partial solution or due to mechanical entrainment. It is therefore obvious that the proportion of plasticizer which will be present in the precipitated polymer depends on the partition coefficient or relative solubilities of the plasticizer in the original solvent and in the precipitated polymer. Hence the amount of plasticizer incorporated in the precipitated polymer may be controlled to a certain extent at least by varying the type of solvent and precipitating agent or non-solvent in accordance with the type of polymer to be precipitated and the type of plasticizer to be incorporated therewith. At times, it may be desirable to redissolve a once precipitated plasticized polymer in the same or different type of solvent containing the same or another plasticizer in solution and under the same or different conditions of temperature and pressure, etc.

The following examples serve to illustrate the process involved but the invention is not in any way limited thereby:

Example 1

A highly polymerized vinyl acetate is dissolved in dibutyl phthalate to the extent of 12%, preferably while heated to 100–120° F. About 40 grams of Varsol (a light petroleum hydrocarbon solvent) are slowly added to 50 grams of this solution while stirring slowly, and after all of the Varsol has been added, the precipitated plastic is obtained in the form of a soft ball on the stirrer. It is then removed and the excess liquid is squeezed out. After this operation the plastic contains 10–25% of the plasticizer and is easily rolled out into sheets, moulded, or employed as a coating or tire composition. The remaining Varsol-dibutyl phthalate mixture is distilled to remove the Varsol, and the materials are subsequently employed for similar operations.

Example 2

The process is carried out in a manner similar to that disclosed in Example 1, except that the solution prior to precipitation contains the following ingredients:

|  | Per cent |
|---|---|
| Polyvinyl acetate | 15.0 |
| Sulfur | 0.1 |
| Voltolized rapeseed oil | 0.5 |
| Carbon black | 1.0 |
| Glyptal resin | 1.0 |
| Diamyl phthalate | 82.4 |
|  | 100.0 |

Most of the solids originally in suspension are adsorbed on the coagulated polymer and are evenly distributed throughout the whole mass. The resulting plastic is mechanically worked to remove excess solvent and coagulent and then employed as such in moulding or coating compositions, or as a waterproofing layer for canvas, etc.

Example 3

Diphenyl oxide is heated to about 300° F. and 10% polyvinyl acetate is dissolved together with 0.5% of a polymerized isobutylene of 8,000 to 10,000 molecular weight. The following materials are then added:

|  | Per cent |
|---|---|
| Black dye | 0.01 |
| Alpha-naphthol | 0.05 |
| Trinitrobenzene | 0.05 |
| Zinc oxide | 1.00 |
| Asphalt | 0.50 |
| Chlorinated diphenyl (62% chlorine) | 0.50 |

Upon coagulation with naphtha, and pressing, the plastic is kneaded with 20% carbon black until the latter is thoroughly worked in. The product so formed has been found suitable for roofing compositions, plastic products, and the like.

It is apparent that wide variations from the above examples can be used without departing from the primary scope of the invention and the invention is therefore not intended to be limited either by the examples nor by any theories as to the operation of the invention but only by the appended claims in which it is intended to claim all inherent novelty in the invention.

I claim:

1. The process according to claim 8, in which the vinyl compound is a vinyl halide.

2. The process according to claim 8, in which the vinyl compound is a mixture of vinyl chloride and vinyl acetate.

3. The process according to claim 8, in which the vinyl compound is a vinyl ester.

4. The process according to claim 8, in which the plasticizer is a soluble high molecular weight organic compound.

5. The method of preparing plasticized rubber substitutes, which comprises dissolving a hard, brittle, vinyl polymer in a solvent containing a normally fluid plasticizer boiling above 200° C. and co-precipitating from said solvent the polymerized vinyl compound together with a small but effective proportion of the plasticizer by the addition of a suitable non-solvent.

6. The method of preparing plasticized rubber substitutes, which comprises dissolving a hard, brittle, vinyl polymer in a solvent containing a suitable plasticizer and co-precipitating the polymer together with a small but effective proportion of the plasticizer by adding a light petroleum fraction.

7. The method of preparing plasticized rubber substitutes, which comprises precipitating a highly polymerized normally hard, brittle vinyl compound from solution in the presence of a plasticizer boiling above 200° C. which is liquid at room temperature and at least partially soluble in the polymerized compound.

8. The process of preparing rubber substitutes which comprises polymerizing a vinyl compound to a normally high molecular weight hard, brittle polymer in the presence of a solvent without any separation of polymer from the solvent, then adding to the solution 0.1 to 20 percent of a soluble organic liquid boiling at above 200° C., based on the weight of the vinyl compound, and precipitating the polymerized product out of solution by adding an organic liquid precipitant thereto.

9. The method of preparing a tough elastic rubber substitute, which comprises precipitating a normally high molecular weight, hard, brittle polyvinyl acetate from solution in a solvent in the presence of a substantially non-volatile plasticizer by adding to the solution an effective amount of naphtha.

PETER J. WIEZEVICH.